(12) United States Patent
Mueller et al.

(10) Patent No.: US 7,033,300 B2
(45) Date of Patent: Apr. 25, 2006

(54) CLUTCH ACTUATION SYSTEM FOR TWO-SPEED ACTIVE TRANSFER CASE

(75) Inventors: Joseph G. Mueller, Ballston Spa, NY (US); Aaron Ronk, Lake George, NY (US)

(73) Assignee: Magna Powertrain, Inc., Troy, MI (US)

( * ) Notice: Subject to any disclaimer, the term of this patent is extended or adjusted under 35 U.S.C. 154(b) by 0 days.

(21) Appl. No.: 11/124,868

(22) Filed: May 9, 2005

(65) Prior Publication Data

US 2005/0202919 A1 Sep. 15, 2005

Related U.S. Application Data

(63) Continuation of application No. 10/720,654, filed on Nov. 24, 2003, now Pat. No. 6,929,577.

(51) Int. Cl.
*F16H 37/08* (2006.01)

(52) U.S. Cl. .................. 475/295; 475/204

(58) Field of Classification Search ............ 475/198, 475/204, 295; 74/665 G, 665 T; 192/84.6
See application file for complete search history.

(56) References Cited

U.S. PATENT DOCUMENTS

| | | | |
|---|---|---|---|
| 4,805,486 A | 2/1989 | Hagiwara et al. | 475/150 |
| 4,895,236 A | 1/1990 | Sakakibara et al. | 192/84.6 |
| 4,950,214 A | 8/1990 | Botterill | 475/231 |
| 5,007,886 A | 4/1991 | Holmquist et al. | 475/231 |
| 5,080,640 A | 1/1992 | Botterill | 475/231 |
| 5,323,871 A | 6/1994 | Wilson et al. | 180/197 |
| 5,330,030 A * | 7/1994 | Eastman et al. | 180/247 |
| 5,352,164 A | 10/1994 | Bensinger et al. | 475/223 |
| 5,363,938 A | 11/1994 | Wilson et al. | 180/233 |
| 5,407,024 A | 4/1995 | Watson et al. | 180/248 |
| 5,423,235 A | 6/1995 | Botterill et al. | 74/665 GA |
| 5,520,590 A | 5/1996 | Showalter et al. | 475/295 |
| 5,522,776 A * | 6/1996 | Alvey | 475/295 |
| 5,655,986 A | 8/1997 | Wilson et al. | 475/204 |
| 5,771,477 A * | 6/1998 | Showalter et al. | 475/295 |
| 6,001,041 A * | 12/1999 | Sawase et al. | 475/198 |
| 6,099,430 A * | 8/2000 | Winks | 475/204 |
| 6,173,624 B1 * | 1/2001 | Decker | 74/473.37 |
| 6,203,465 B1 | 3/2001 | Showalter | 475/204 |
| 6,230,577 B1 | 5/2001 | Showalter et al. | 74/337.5 |
| 6,296,590 B1 | 10/2001 | Gassmann | 475/231 |

(Continued)

FOREIGN PATENT DOCUMENTS

DE 3908478 A1 10/1989

(Continued)

*Primary Examiner*—Sherry Estremsky
(74) *Attorney, Agent, or Firm*—Harness, Dickey & Pierce P.L.C.

(57) ABSTRACT

A transfer case includes a two-speed range unit, a friction clutch, an actuation mechanism, and a control system. The actuation mechanism includes an electric motor, a geartrain driven by the motor, a range actuator assembly and a mode actuator assembly. The range actuator assembly includes a driveshaft driven by the geartrain, a cam driven by the driveshaft, and a shift fork having a follower retained in a groove formed in the cam and a fork engaging a shift collar associated with the range unit. The mode actuator assembly has a cam member with ramp surfaces and a control gear with rollers engaging the ramp surfaces. The control gear is rotatively driven by the geartrain. The cam member is axially moveable for controlling engagement of the friction clutch. An anti-rotation mechanism limits rotation of the cam member in response to continued rotation of the control gear.

25 Claims, 14 Drawing Sheets

U.S. PATENT DOCUMENTS

| | | |
|---|---|---|
| 6,367,344 B1 | 4/2002 | Vogt et al. .................... 74/335 |
| 6,398,686 B1 | 6/2002 | Irwin ......................... 475/150 |
| 6,405,822 B1 | 6/2002 | Lee ............................ 180/251 |
| 6,484,857 B1 | 11/2002 | Vonnegut et al. ............. 192/35 |
| 6,503,167 B1 | 1/2003 | Sturm ....................... 475/231 |
| 6,568,519 B1 | 5/2003 | Lovatt ...................... 192/56.6 |
| 6,905,436 B1 * | 6/2005 | Mueller et al. ............. 475/295 |
| 2002/0142877 A1 | 10/2002 | Williams et al. ............ 475/198 |
| 2003/0192401 A1 | 10/2003 | Thomas et al. ........ 74/665 GA |

FOREIGN PATENT DOCUMENTS

| | | |
|---|---|---|
| JP | 2-18117 | 1/1990 |
| JP | 3-66927 | 3/1999 |

* cited by examiner

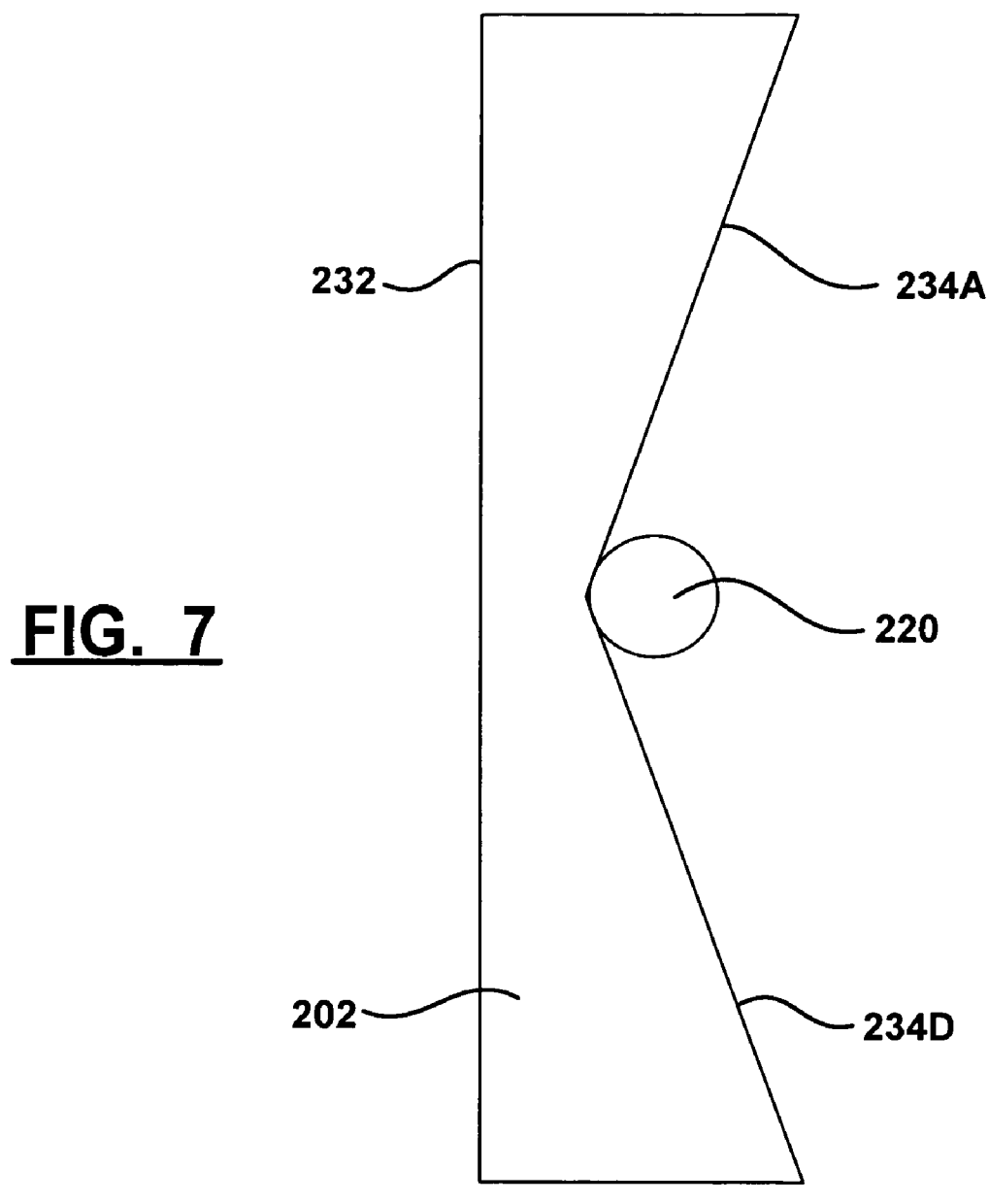

CLUTCH ACTUATION SYSTEM FOR TWO-SPEED ACTIVE TRANSFER CASE

CROSS-REFERENCE TO RELATED APPLICATIONS

This application is a continuation of U.S. patent application Ser. No. 10/720,654 filed Nov. 24, 2003 now U.S. Pat. No. 6,929,577.

FIELD OF THE INVENTION

The present invention relates generally to power transfer systems for controlling the distribution of drive torque between the front and rear drivelines of a four-wheel drive vehicle. More particularly, the present invention is directed to a power transmission device for use in motor vehicle driveline applications having a power-operated clutch actuator that is operable for controlling actuation of a multi-plate friction clutch assembly.

BACKGROUND OF THE INVENTION

In view of increased consumer popularity in four-wheel drive vehicles, a plethora of power transfer systems are currently being utilized in vehicular driveline applications for selectively directing power (i.e., drive torque) from the powertrain to all four wheels of the vehicle. In many power transfer systems, a transfer case is incorporated into the driveline and is operable in a four-wheel drive mode for delivering drive torque from the powertrain to both the front and rear wheels. Many conventional transfer cases are equipped with a mode shift mechanism that can be selectively actuated to shift between a two-wheel drive mode and a part-time four-wheel drive mode. In addition, many transfer cases also include a range shift mechanism which can be selectively actuated by the vehicle operator for shifting between four-wheel high-range and low-range drive modes.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a friction clutch assembly and a power-operated clutch actuator that is interactively associated with an electronic control system and a sensor arrangement. During normal road conditions, the clutch assembly is typically maintained in a released condition such that drive torque is only delivered to the rear wheels. However, when the sensors detect a low traction condition, the clutch actuator is equipped for engaging the clutch assembly to deliver drive torque "on-demand" to the front wheels. Moreover, the amount of drive torque transferred through the clutch assembly to the non-slipping wheels can be varied as a function of specific vehicle dynamics, as detected by the sensor arrangement. This on-demand clutch control system is also used in full-time transfer cases to automatically bias the torque ratio across an interaxle differential.

In some two-speed transfer cases the range shift mechanism and the clutch assembly are independently controlled by separate power-operated actuators. For example, U.S. Pat. No. 5,407,024 discloses a two-speed range shift mechanism actuated by an electric motor and a clutch assembly actuated by an electromagnetic coil. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven sector with cam surfaces adapted to coordinate actuation of the range shift mechanism and the clutch assembly for establishing a plurality of distinct two-wheel and four-wheel drive modes. While transfer cases equipped with such coordinated actuation systems have been commercially successful, a need exists to develop alternative clutch actuation systems which further reduce the cost and complexity of two-speed actively-controlled transfer cases.

SUMMARY OF THE INVENTION

Accordingly, it is an objective of the present invention to provide a transfer case equipped with a two-speed range unit, a mode clutch assembly, and a power-operated actuation mechanism for controlling coordinated actuation of the range unit and the mode clutch assembly.

It is another objective of this invention that the transfer case be interactively associated with a control system for controlling operation of the power-operated actuation mechanism to establish various four-wheel high-range and low-range drive modes.

It is further objective of the present invention to locate the mode clutch assembly across an interaxle differential to provide automatic torque biasing and slip limiting features in a full-time four-wheel drive mode.

As an additional objective, the mode clutch assembly can be operably disposed between the front and rear output shafts of the transfer case to provide automatic torque transfer in an on-demand four-wheel drive mode.

Another objective is to provide a synchronized range unit for permitting on-the-move shifting between the high-range and low-range drive modes.

According to a preferred embodiment, a transfer case is provided with a two-speed range unit, an interaxle differential, a mode clutch assembly, a power-operated actuation mechanism, and a control system. The range unit includes a planetary gearset driven by the input shaft, and a synchronized dog clutch for releasably coupling one of the input shaft and an output component of the planetary gearset to an input member of the interaxle differential. The interaxle differential further includes a first output member driving a first output shaft, a second output member operably driving a second output shaft, and a gearset for transferring drive torque from the input member to the first and second output members. The mode clutch assembly is a multi-plate friction clutch operably disposed between the first and second output shafts. The power-operated actuation mechanism includes an electric motor, a geartrain driven by the motor, a range actuator assembly and a mode actuator assembly. The range actuator assembly includes a driveshaft driven by the geartrain, a range cam rotatively driven by the driveshaft, and a shift fork having a follower segment retained in a groove formed in the range cam and a fork segment retained in a groove formed in a shift collar associated with the synchronized dog clutch. Rotation of the range cam results in transitional movement of the shift collar between high-range (H), neutral (N) and low-range (L) positions. The mode actuator assembly is a roller ramp unit having a cam member with ramp surfaces and a control gear with rollers engaging the ramp surfaces. The cam member is axially moveable for controlling engagement of the friction clutch. The control gear is rotatively driven by the geartrain for initially causing concurrent rotation of the cam member.

This initial rotary non-translational movement of the cam member permits sufficient rotation of the driveshaft to move the shift collar between its three range position while the friction clutch is maintained in a disengaged state. An anti-rotation mechanism limits rotation of the cam member in response to continued rotation of the control gear for causing translational non-rotary movement of the cam member, due to engagement of the rollers on the ramp surfaces, thereby causing engagement of the friction clutch. The control system is adapted to control the magnitude and direction of rotary motion of the driveshaft and the control gear through controlled energization of the electric motor.

The power-operated actuation system of the present invention is arranged to permit sufficient bi-directional rotation of the geartrain to cause movement of the shift collar between its H and L positions without causing the roller ramp unit to engage the multi-plate friction clutch. However, once the shift collar is positively located in either of the H or L positions, continued rotation of the geartrain causes actuation of the roller ramp unit for exerting the clutch engagement force on the multi-plate friction clutch.

BRIEF DESCRIPTION OF THE DRAWINGS

Further objects, features and advantages of the present invention will become apparent from analysis of the following written specification including the appended claims, and the accompanying drawings in which:

FIG. 7 is a side view of the roller ramp associated with mode actuator assembly.

DETAILED DESCRIPTION OF THE PREFERRED EMBODIMENTS

Figure 1:
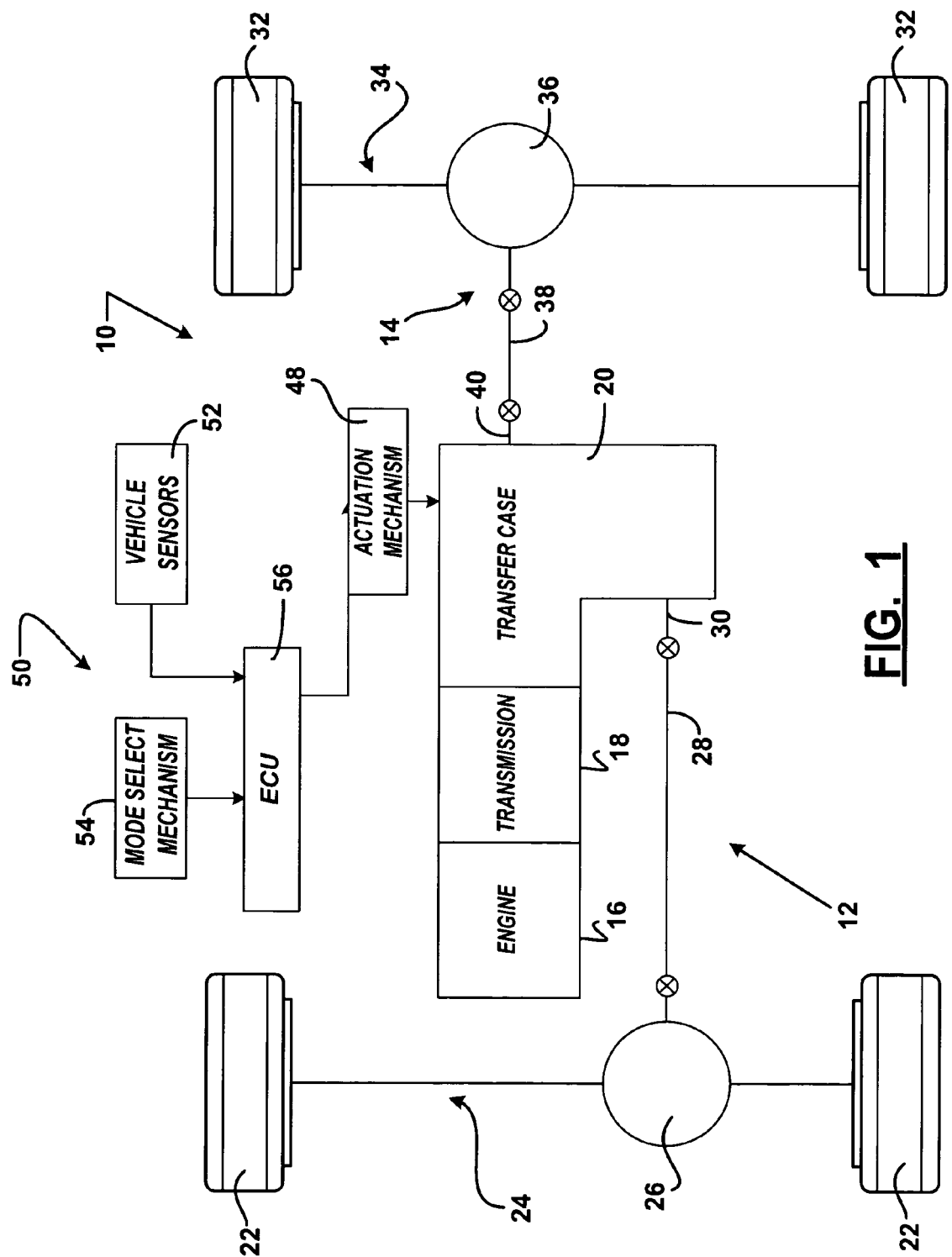
FIG. 1 is a schematic view of a four-wheel drive vehicle equipped with a transfer case and a control system according to the present invention.

Referring now to the drawings, a four-wheel drive vehicle 10 is schematically shown to include a front driveline 12, a rear driveline 14, and a powertrain for generating and selectively delivering rotary tractive power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front driveshaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear driveshaft 38, the opposite end of which is interconnected to a rear output shaft 40 of transfer case 20.

As will be further detailed, transfer case 20 is equipped with a two-speed range unit 42, an interaxle differential 44, a mode clutch assembly 46, and a power-operated actuation mechanism 48 operable to control coordinated shifting of range unit 42 and adaptive engagement of mode clutch assembly 46. In addition, a control system 50 is provided for controlling actuation of actuation mechanism 48. Control system 50 includes vehicle sensors 52 for detecting real time operational characteristics of motor vehicle 10, a mode select mechanism 54 for permitting the vehicle operator to select one of the available drive modes, and an electronic control unit (ECU) 56 that is operable to generate electric control signals in response to input signals from sensors 52 and mode signals from mode select mechanism 54. The control signals are sent to an electric motor assembly 58 associated with actuation mechanism 48.

Figure 2:
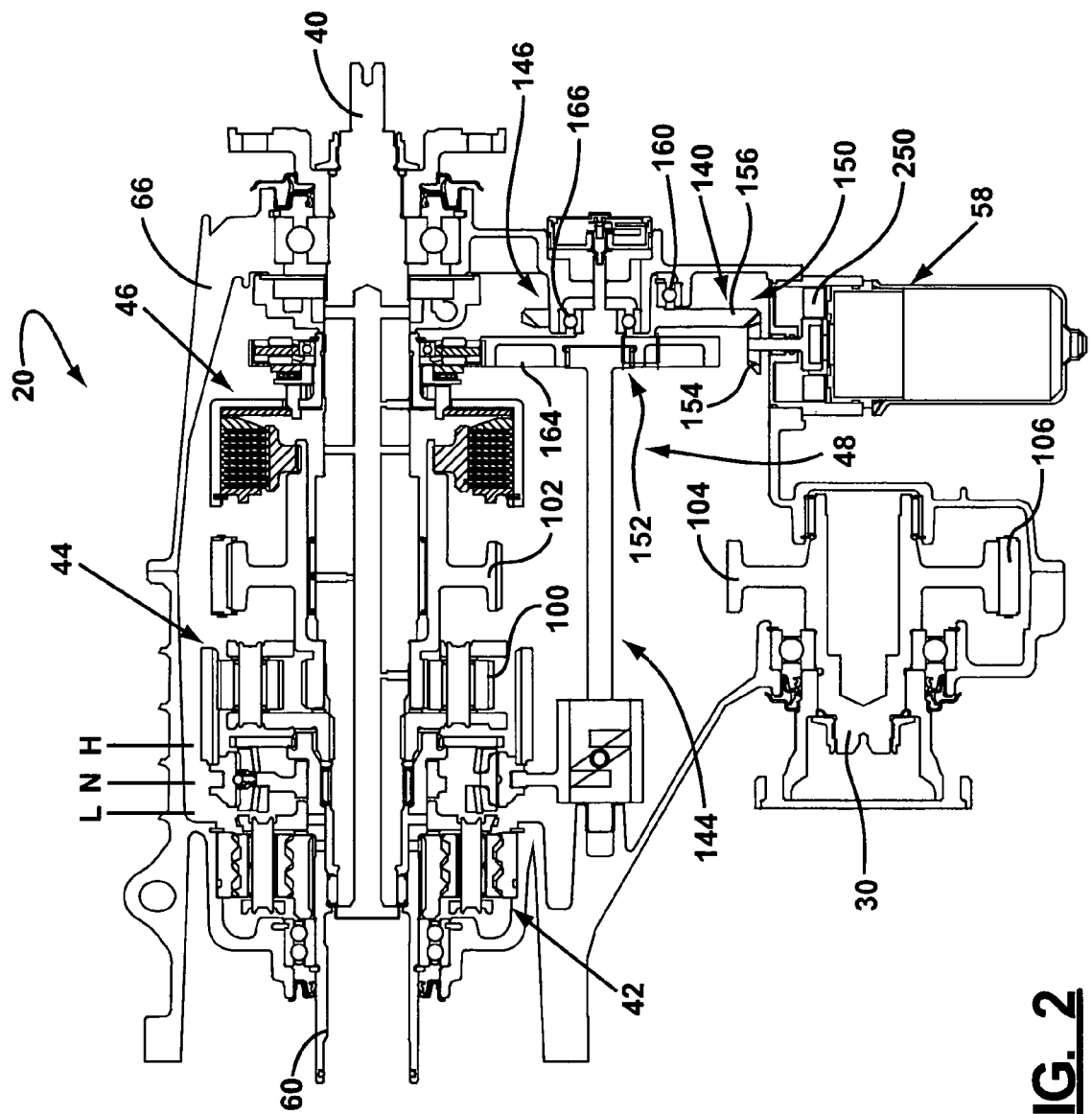
FIG. 2 is a sectional view of a two-speed full-time transfer case constructed in accordance with one preferred embodiment of the present invention.
Figure 3:
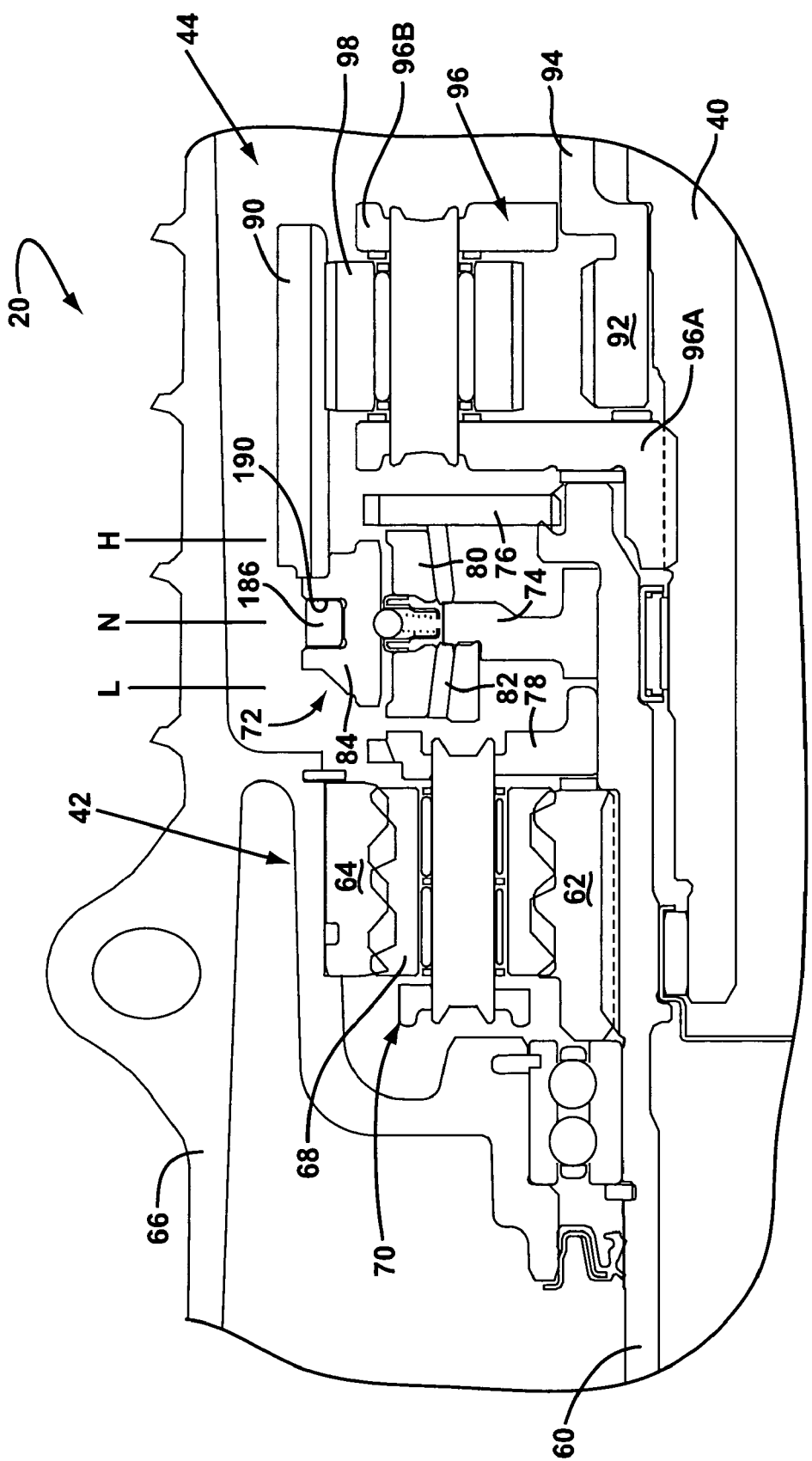
FIGS. 3 through 5 are enlarged partial views of FIG. 2 showing various components of the transfer case in great detail.

With particular reference to FIGS. 2 and 3, transfer case 20 is shown to include an input shaft 60 adapted to be driven by the output shaft of transmission 18. Range unit 42 includes a planetary gearset having a sun gear 62 driven by input shaft 60, a ring gear 64 non-rotatably fixed to a portion of a housing 66, and planet gears 68 rotatably supported from a planet carrier 70 and which are meshed with both sun gear 62 and ring gear 64. Range unit 42 further includes a synchronized dog clutch assembly 72 having a clutch hub 74 journalled on input shaft 60, a first clutch plate 76 fixed for rotation with input shaft 60, and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78, and a shift collar 84 splined for rotation with and axial sliding movement on clutch hub 74. As will be detailed, shift collar 84 is arranged to selectively drive an input member of interaxle differential 44.

Shift collar 84 is shown in its central neutral (N) position where it is disengaged from both first clutch plate 76 and second clutch plate 78. With shift collar 84 in its N position, transfer case 20 is in a Neutral non-driven mode with input shaft 60 uncoupled from driven connection with the input of interaxle differential 44, whereby no drive torque is transmitted to either of the output shafts. Shift collar 84 is moveable from its N position to a high-range (H) position whereat shift collar 84 is coupled to first clutch plate 76 and is driven at a direct speed ratio relative to input shaft 60. Accordingly, location of shift collar 84 in its H position functions to establish a high-range drive connection between input shaft 60 and the input to interaxle differential 44. In contrast, shift collar 84 can be moved from its N position to a low-range (L) position whereat shift collar 84 is coupled to second clutch plate 78 and is driven by planet carrier 70 at a reduced speed ratio relative to input shaft 60. Such movement of shift collar 84 to its L position functions to establish a low-range drive connection between input shaft 60 and the input to interaxle differential 44. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

It is contemplated that transfer case 20 could be equipped without synchronizers 80 and 82 if a non-synchronized range shift system is desired. Likewise, the planetary gearset and range shift arrangement shown are tended to merely be representative of one type of two-speed range unit available for use in transfer cases. To this end, any two-speed reduction unit having a shift member moveable to establish first and second ratio drive connections is considered to be within the scope of this invention.

Interaxle differential 44 includes an input member driven by shift collar 84, a first output member driving rear output shaft 40, and a second output member operably arranged to drive front output shaft 30. In particular, interaxle differential 44 includes an annulus gear 90 fixed for rotation and axial sliding movement with shift collar 84, a sun gear 92 fixed to a quill shaft 94 that is rotatably supported on rear output shaft 40, and a pinion carrier assembly 96 fixed (i.e., splined) to rear output shaft 40. Pinion carrier assembly 96 includes a first carrier ring 96A fixed (i.e., splined) for rotation with rear output shaft 40, a second carrier ring 96B, and pins rotatably supporting meshed pairs of first pinion gears 98 and second pinion gears 100 (see FIG. 2) therebetween. In addition, first pinion gears 98 are meshed with annulus gear 90 while second pinion gears 100 are meshed with sun gear 92. As such, driven rotation of annulus gear 90 (at either of the direct or reduced speed ratios) causes drive torque to be transmitted to rear output shaft 40 via pinion carrier assembly 96 and to quill shaft 94 via sun gear 92. Drive torque is transferred from quill shaft 94 to front output shaft 30 through a transfer assembly which includes a drive sprocket 102 fixed to quill shaft 94, a driven sprocket 104 fixed to front output shaft 30, and a drive chain 106 meshed with sprockets 102 and 104. Based on the particular configuration and sizing of the gears associated with interaxle differential 44, a specific torque distribution ratio is established (i.e., 50/50, 64/36) between rear output shaft 40 and front output shaft 30.

Figure 4:
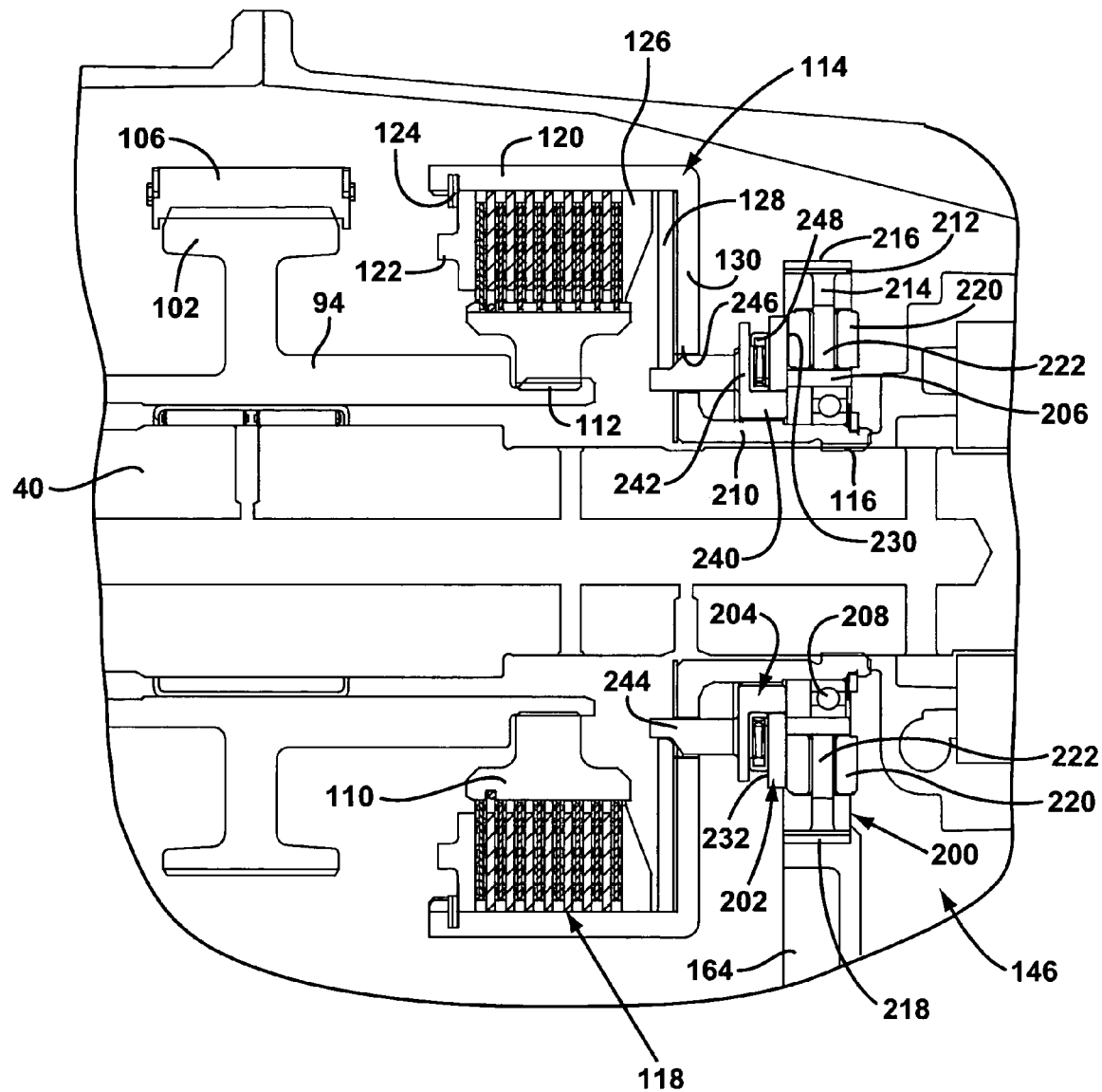

Referring primarily to FIG. 4, mode clutch assembly 46 is shown to include a clutch hub 110 fixed via a spline connection 112 to a tubular end segment of quill shaft 94, a clutch drum 114 fixed via a spline connection 116 to rear output shaft 40, and a multi-plate clutch pack 118 operably disposed between hub 110 and drum 114. Clutch pack 118 includes a set of outer clutch plates that are splined for rotation with and axial movement on an outer cylindrical rim segment 120 of drum 114. Clutch pack 118 also includes a set of inner clutch plates that are splined for rotation with and axial movement on clutch hub 110. Clutch assembly 46 further includes a reaction plate 122 that is splined for rotation with outer rim segment 120 of drum 114 and retained thereon via a lock ring 124, and a pressure plate 126 that is also splined for rotation with outer rim segment 120 of drum 114. Pressure plate 126 is adapted to move axially for exerting a compressive clutch engagement force on clutch pack 118 in response to resilient pivotal movement of disk levers 128. Disk levers 128 are shown to be located between pressure plate 126 and a radial plate segment 130 of drum 114.

Pressure plate 126 is axially moveable relative to clutch pack 118 between a first or "released" position and a second or "locked" position. With pressure plate 126 in its released position, a minimum clutch engagement force is exerted on clutch pack 118 such that virtually no drive torque is transferred through clutch assembly 46 so as to establish a differentiated or full-time four-wheel drive mode. In contrast, location of pressure plate 126 in its locked position causes a maximum clutch engagement force to be applied to clutch pack 118 such that front output shaft 30 is, in effect, coupled for common rotation with rear output shaft 40 so as to establish a non-differentiated or locked four-wheel drive mode. Therefore, accurate control of the position of pressure plate 126 between its released and locked position permits adaptive regulation of the torque biasing between rear output shaft 40 and front output shaft 30, thereby establishing an adaptive all-wheel drive mode.

Power-operated actuation mechanism 48 is operable to coordinate movement of shift collar 84 between its three distinct range positions with movement of pressure plate 126 between its released and locked positions. In its most basic form, actuation mechanism 48 includes an electric motor assembly 58, a reduction geartrain 140 driven by motor assembly 58, a range actuator assembly 144, and a mode actuator assembly 146.

Reduction geartrain 140 includes a bevel gearset 150 and a spur gearset 152. Bevel gearset 150 includes a drive pinion 154 that is driven by an output shaft of electric motor assembly 58 and meshed with a bevel gear 156 to provide a first reduction ratio. Bevel gear 156 is rotatably supported by a bearing assembly 160 from housing 66 for rotation about a first rotary axis. The first reduction ratio established by bevel gearset 150 is preferably in the range of 3:1 to 10:1 and, more preferably, is about 6:1. Spur gearset 152 includes a first gear 162 rigidly secured to bevel gear 156 for common rotation about the first rotary axis and which is meshed with a second gear 164 to provide a second reduction ratio. Second gear 164 is rotatably supported from housing 66 by a bearing assembly 166 for rotation about a second rotary axis. Preferably, the second reduction ratio provided by spur gearset 152 is similar in range to that of bevel gearset 150 with a preferred ratio of about 6:1. The cumulative reduction of about 36:1 between the output shaft of electric motor assembly 58 and second gear 164 permits the use of a small, low power electric motor.

Figure 5:
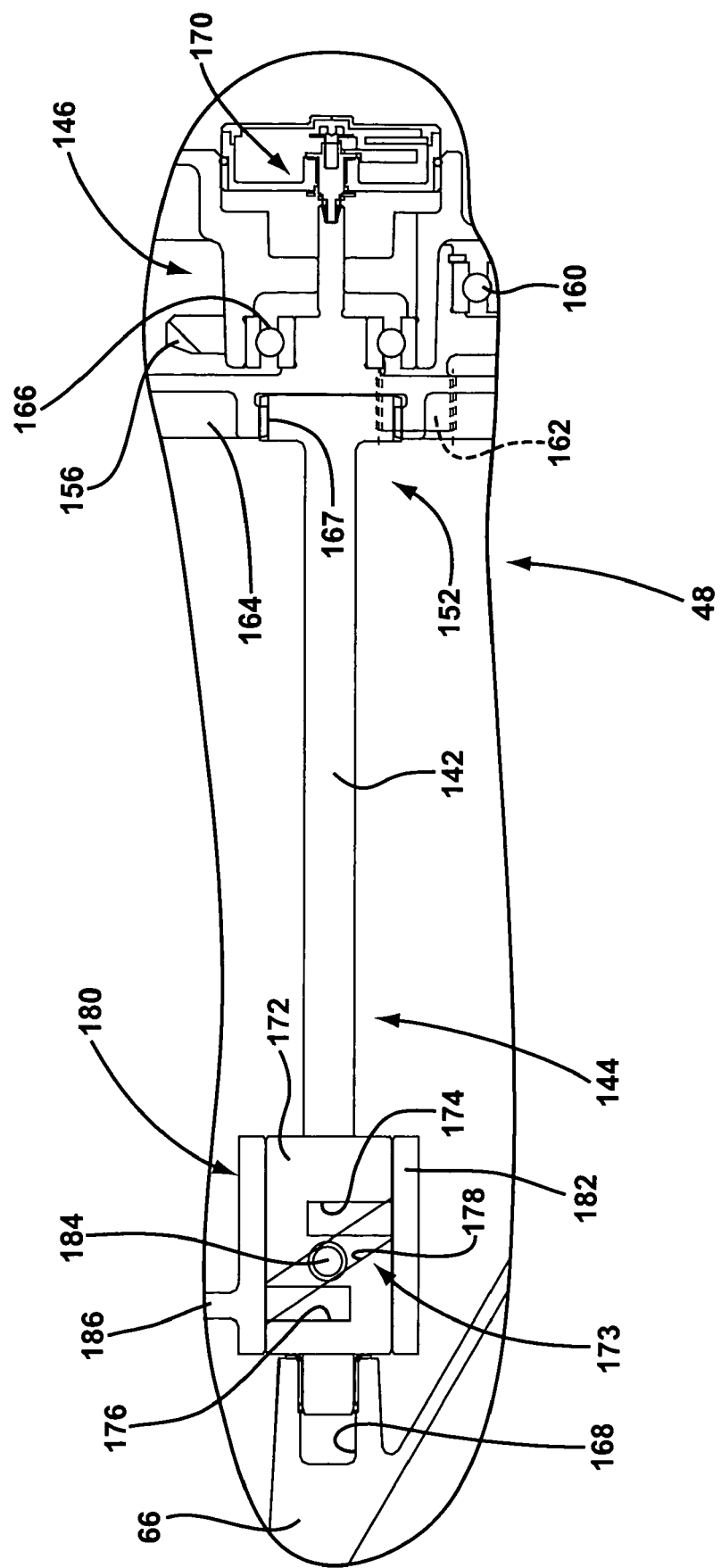

Referring primarily to FIG. 5, range actuator assembly 144 is shown to include a driveshaft 142 and a range cam 172 that is fixed for rotation with driveshaft 142. As seen, driveshaft 142 has a first end fixed via a spline connection 167 for common rotation with second gear 164 and a second end that is rotatably supported in a socket 168 formed in housing 66. In addition, an angular position sensor, such as an encoder unit 170, is provided for accurately detecting the rotated position of second gear 164. Range cam 172 is cylindrical and includes a circumferential groove 173 comprised of a high-range dwell segment 174, a low-range dwell segment 176, and a helical intermediate shift segment 178 interconnecting dwell segments 174 and 176. Range actuator assembly 144 further includes a range fork 180 having a tubular sleeve 182 surrounding range cam 172, a follower pin 184 which extends from range fork sleeve 182 into groove 173, and a fork segment 186 extending from sleeve 182 into an annular groove 190 formed in shift collar 84.

Rotation of range cam 172 results in axial movement of shift collar 84 due to the movement of follower pin 184 within shift segment 178 of groove 173. Specifically, when it is desired to shift range unit 42 into its high-range drive mode, electric motor 58 is energized to cause rotation of second gear 164 and driveshaft 142 in a first direction which, in turn, causes concurrent rotation of range cam 172. Such rotation of range cam 172 causes follower pin 184 to move within intermediate shift segment 178 of groove 173 until shift collar 84 is located in its H position. With shift collar 84 in its H position, the high-range drive connection is established between input shaft 60 and annulus gear 90. Continued rotation of second gear 164 and driveshaft 142 in the first direction causes follower pin 184 to exit shift segment 178 and enter high-range dwell segment 174 for maintaining shift collar 84 in its H position. Thereafter, concurrent rotation of second gear 164, driveshaft 142 and range cam 172 in the opposite or second direction causes follower pin 184 to exit high-range dwell segment 174 and re-enter helical shift segment 178 for causing shift collar 84 to begin moving from its H position toward its L position. Upon continued rotation of range cam 172 in the second direction, follower pin 184 exits shift segment 178 and enters low-range dwell segment 176 of groove 173 for locating shift collar 84 in its L position and establishing the low-range drive connection between planet carrier 70 and annulus gear 90.

As best seen from FIGS. 2 and 4, mode actuator assembly 146 includes a drive member 200, a cam member 202, and a thrust member 204. Drive member, hereinafter referred to as control gear 200, has a cylindrical inner rim segment 206 rotatably supported by a bearing assembly 208 on an inner sleeve segment 210 of clutch drum 114, an outer rim segment 212, and a web segment 214 therebetween. Outer rim segment 212 is shown to have external gear teeth 216 extending entirely around its outer circumference that are meshed with gear teeth 218 on second gear 164. Control gear 200 further includes a pair of diametrically opposed rollers 220 that are retained in rolling channels formed in web segment 214. Rollers 220 are shown to be mounted for rotation on retainer pins 222 which are secured to web segment 206. According to a preferred construction, the size and number of teeth 218 on second gear 164 are identical to the size and number of teeth 216 on control gear 200 to provide a direct (i.e., 1:1) ratio therebetween.

Cam member 202 is a ring-like structure having an aperture surrounding inner sleeve segment 210 of drum 114 and an outwardly extending anti-rotation lug 224. As best seen from FIG. 6A through 6G, lug 224 is retained between a pair of diametrically opposed anti-rotation shoulder stops 226A and 226B formed in housing 66 so as to permit rotation of cam member 202 through a range of angular travel delimited by anti-rotation stops 226A and 226B. In the arrangement shown, the range of rotary movement for cam member 202 is about 180°. Cam member 202 defines a first face surface 230 and a second face surface 232. First face surface 230 has four sequential ramp surfaces 234A through 234D, and each roller 220 on control gear 200 is maintained in rolling contact with one of these four sequential ramp surfaces. In fact, the ramp surfaces define 90° quadrants with one opposing pair 234A and 234C operable for controlling axial movement of cam member 202 between retracted and extended positions relative to control gear 200 when shift collar 84 is located in its H position. Likewise, the second opposing pair 234B and 234D of ramp surfaces control axial movement of cam member 202 between retracted and extended positions when shift collar 84 is located in its L position. The taper profile of each sequential ramp surface is mirror-image, as shown in FIG. 7, to cause axial movement of cam member 202 between its retracted and extended positions when cam member 202 is prevented from rotating due to engagement of lug 224 with one of anti-rotation stops 226A and 226B.

Thrust member 204 includes a hub segment 240 surrounding inner sleeve segment 210 of drum 114, a plate segment 242 extending radially from hub segment 240, and a plurality of circumferentially-spaced thrust pins 244 that extend axially from plate segment 242. Each thrust pin 244 has a terminal end which extends through a bore 246 formed in plate segment 130 of drum 114 and which is adapted to engage the free end of disk levers 128. A thrust bearing assembly 248 is provided between second face surface 232 of cam plate 202 and plate segment 242 of thrust member 204.

The biasing force exerted by disk levers 128 on thrust member 204 acts to maintain constant engagement of control gear rollers 220 with the ramp surfaces on cam member 202. Accordingly, when cam member 202 is axially located in its retracted position, disk levers 128 are released from engagement with pressure plate 126, whereby pressure plate 126 is located in its released position and clutch assembly 46 is considered to be in a released or non-engaged state. In contrast, axial movement of cam member 202 from its retracted position toward its extended position causes thrust pins 244 to deflect disk levers 128 which, in turn, causes pressure plate 126 to move axially from its released position toward its locked position. As noted, such movement of pressure plate 126 causes a compressive clutch engagement force to be applied to clutch pack 118 for transferring torque through clutch assembly 46. Since control gear 200 is restrained from moving axially, rotation of control gear 200 relative to cam member 202 causes rollers 220 to ride along the ramp surface on cam member 202 which results in axial movement of cam member 202.

As noted, power-operated actuation mechanism 48 coordinates axial movement of shift collar 84 with axial movement of cam member 202 to establish a plurality of different four-wheel drive modes. The available drive modes include a full-time four-wheel high-range (4WH) drive mode, an adaptive all-wheel high-range (AWH) drive mode, a locked four-wheel high-range (LOCK-4WH) drive mode, a Neutral mode, a full-time four-wheel low-range (4WL) drive mode, an adaptive all-wheel low-range (AWL) drive mode and a locked four-wheel low-range (LOCK-4WL) drive mode. While it is contemplated that mode select mechanism 54 would most likely limit the available selection to the AWH, LOCK-4WH, N and LOCK-4WL drive modes in a typical vehicle application, the following description of each drive mode is provided.

Figure 6A:
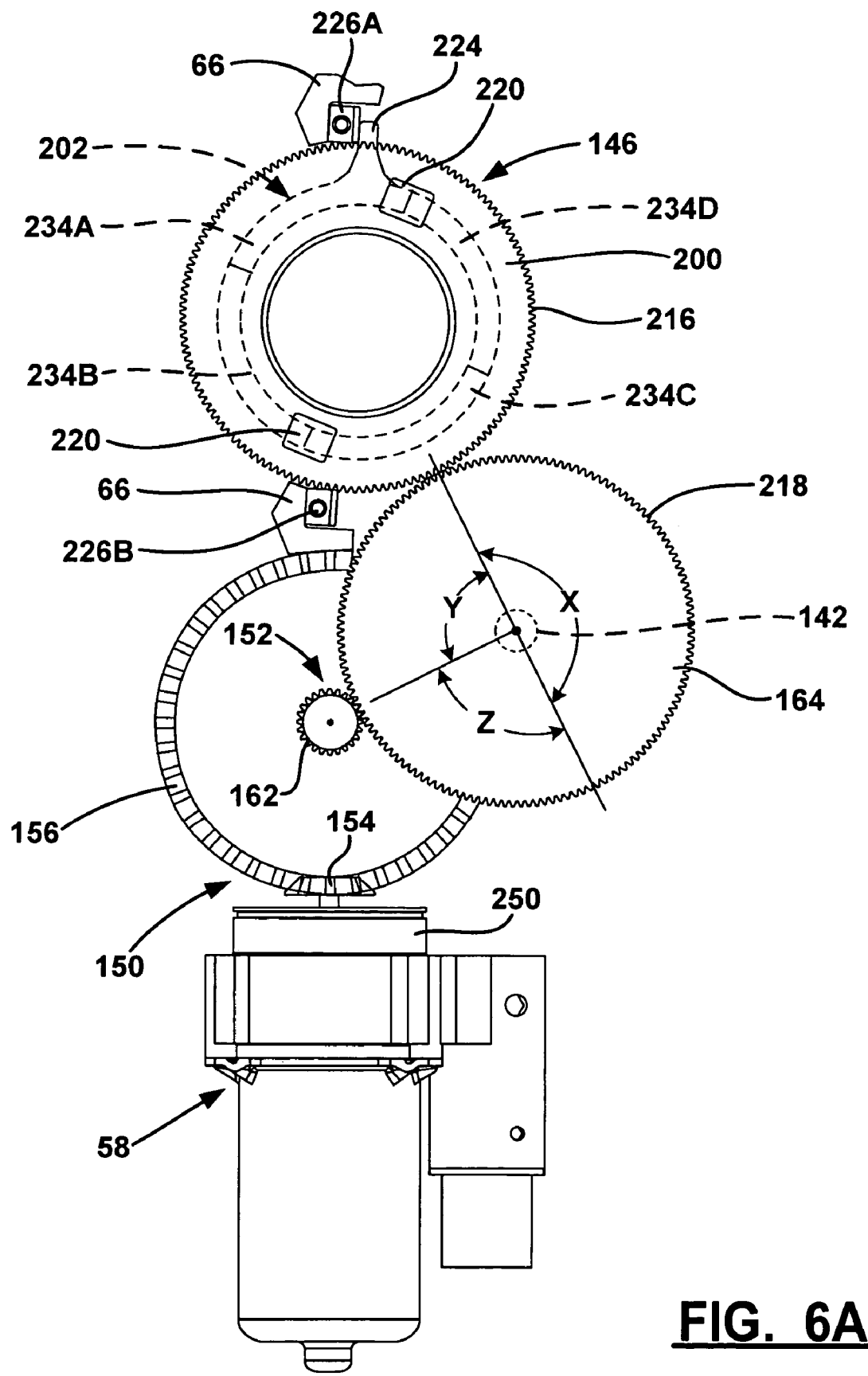
FIGS. 6A through 6G are end views of the components associated with the power-operated actuation mechanism in different positions for establishing the various available drive modes.
Figure 6B:
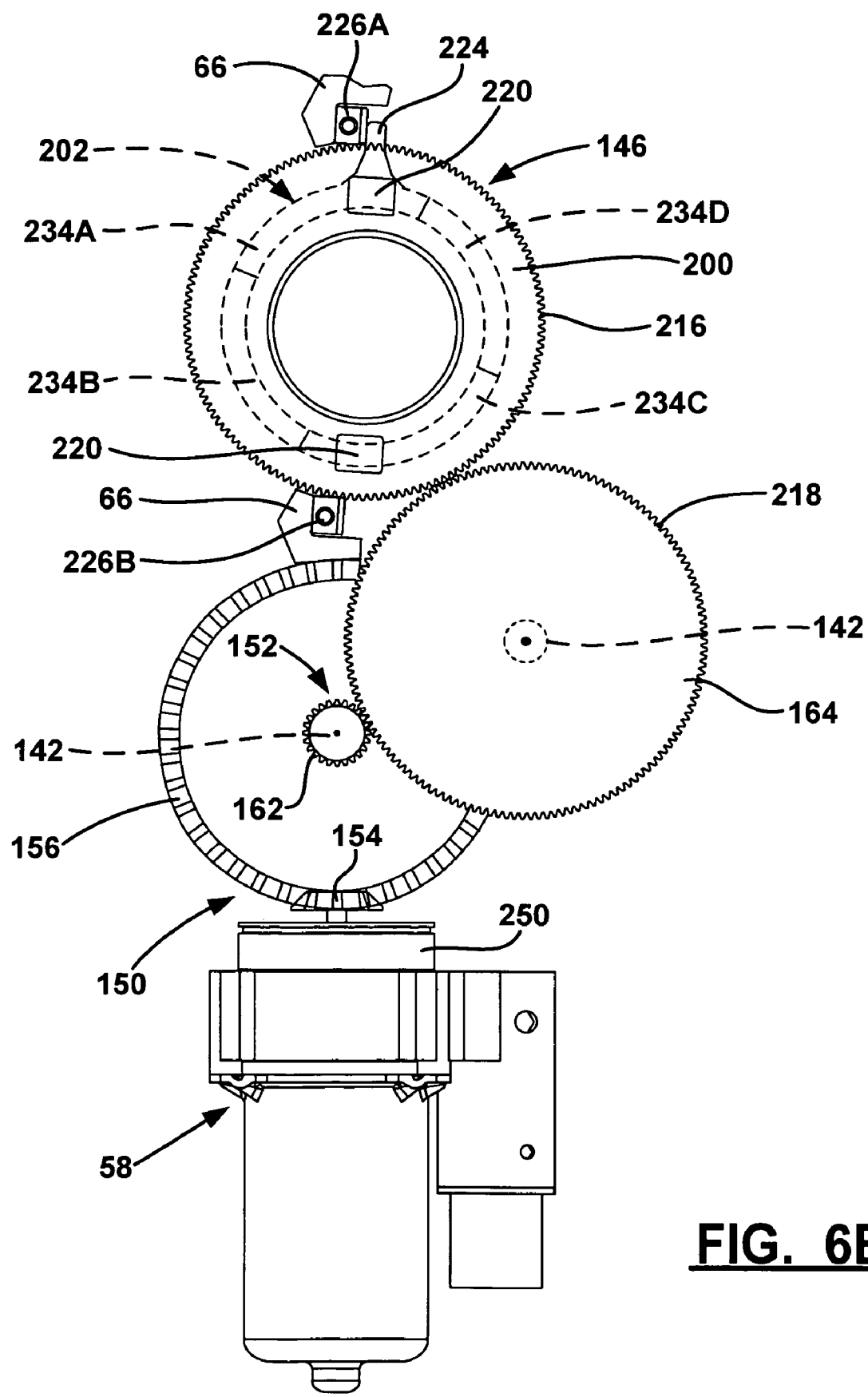

In operation, when mode select mechanism 54 indicates selection of the 4WH drive mode, ECU 56 signals electric motor 58 to rotate geartrain 140 until second gear 164 is located in the position shown in FIG. 6A. Specifically, second gear 164 has been rotated in a first (i.e., clockwise) direction to a position where: A) concurrent rotation of driveshaft 142 has caused shift collar 84 to move to its H position; and B) the resulting rotation of control gear 200 in a first (i.e., counter-clockwise) direction has caused concurrent rotation of cam member 202 until its lug 224 engages anti-rotation stop 226A. In this position, each roller 220 on control gear 200 bear against adjacent ramp surfaces at their complementary low points (see FIG. 7) such that cam member 202 is axially located in its retracted position. As such, pressure plate 126 is located in its released position and clutch assembly 46 is released.

When mode select mechanism 54 thereafter indicates selection of the AWH drive mode, ECU 56 energizes electric motor 58 to cause geartrain 140 to continue rotating second gear 164 in its first direction. As indicated, high-range dwell segment 174 of groove 173 in range cam 172 accommodates the additional rotation of driveshaft 142 resulting from such continued rotation of second gear 164 for maintaining shift collar 84 in its H position. As is evident, continued rotation of second gear 164 in its first direction results in continued rotation of control gear 200 in its first direction. However, such continued rotation of control gear 200 now causes non-rotary axial movement of cam member 202 from its retracted position toward an intermediate or "adapt" position. Specifically, such axial movement of cam member 202 results from tab stop 226A preventing further concurrent rotation of cam member 202 with control gear 200 such that the resultant relative rotation therebetween cause rollers 220 to move to the position shown in FIG. 6B and ride up complimentary ramp surfaces 234A and 234C, thereby causing axial movement of cam member 202 to its adapt position. The adapt position is selected to provide a predetermined low level of torque transfer across mode clutch assembly 46 to take-up clearances in clutch pack 118 in preparation for adaptive control. Thereafter, ECU 56 determines when and how much torque needs to be transmitted across mode clutch assembly 46 to limit excessive interaxle slip between the output shafts based on current tractive conditions and operating characteristics detected by sensors 52.

The limits of adaptive torque control in the AWH drive mode are established by controlling bi-directional rotation of control gear 200 for axially moving cam member 202 between its adapt and extended positions. Axial movement of cam member 202 to its extended position results from further rotation of second gear 164 in its first direction until control gear 200 is located in the position shown in FIG. 6C. Bi-directional rotation of control gear 200 within this range of travel is controlled by ECU 56 controlling energization of electric motor 58 based on a pre-selected torque control strategy. As will be understood, any control strategy known in the art for adaptively controlling actuation of clutch assembly 46 can be used with the present invention.

Figure 6C:
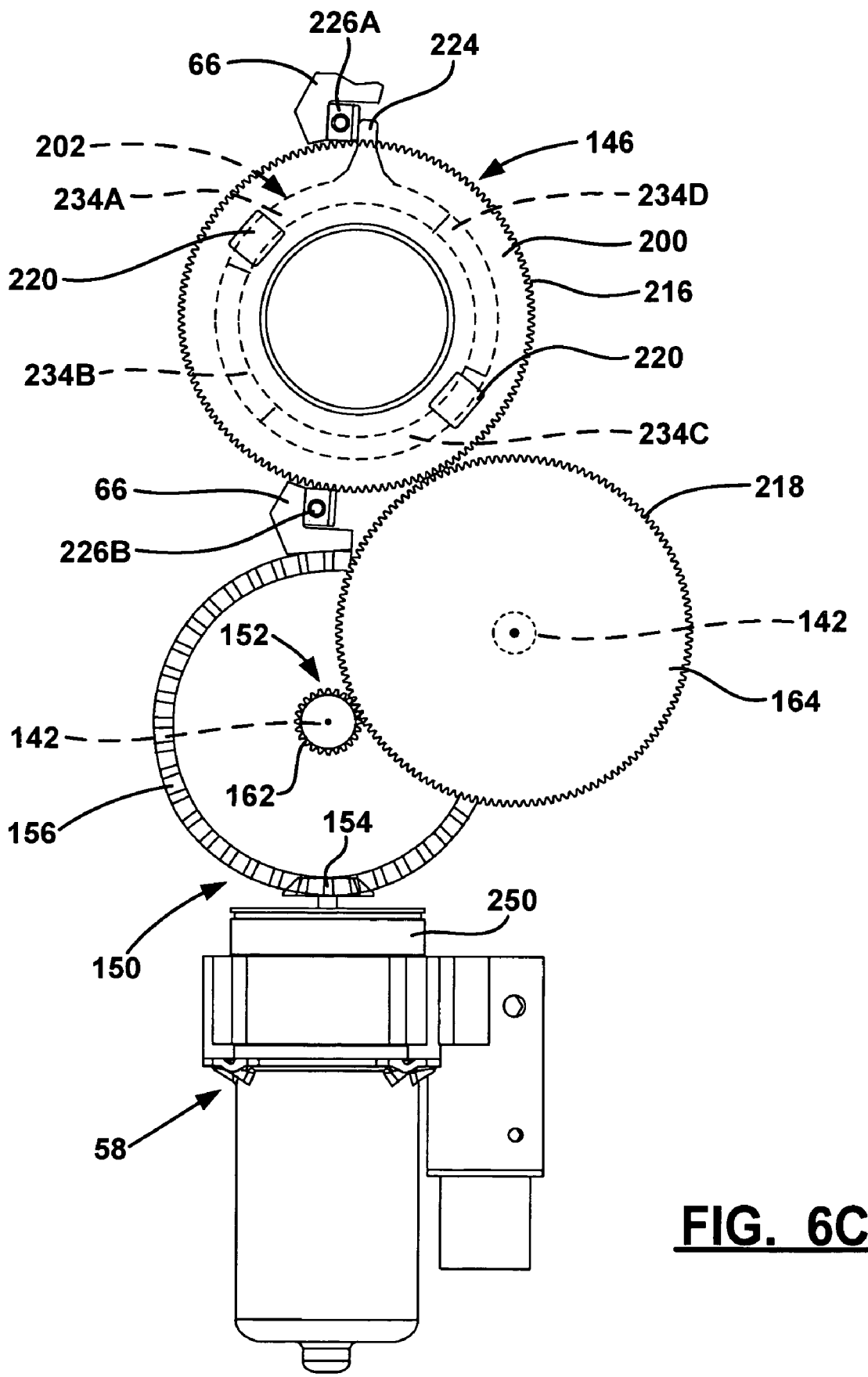
Figure 6D:
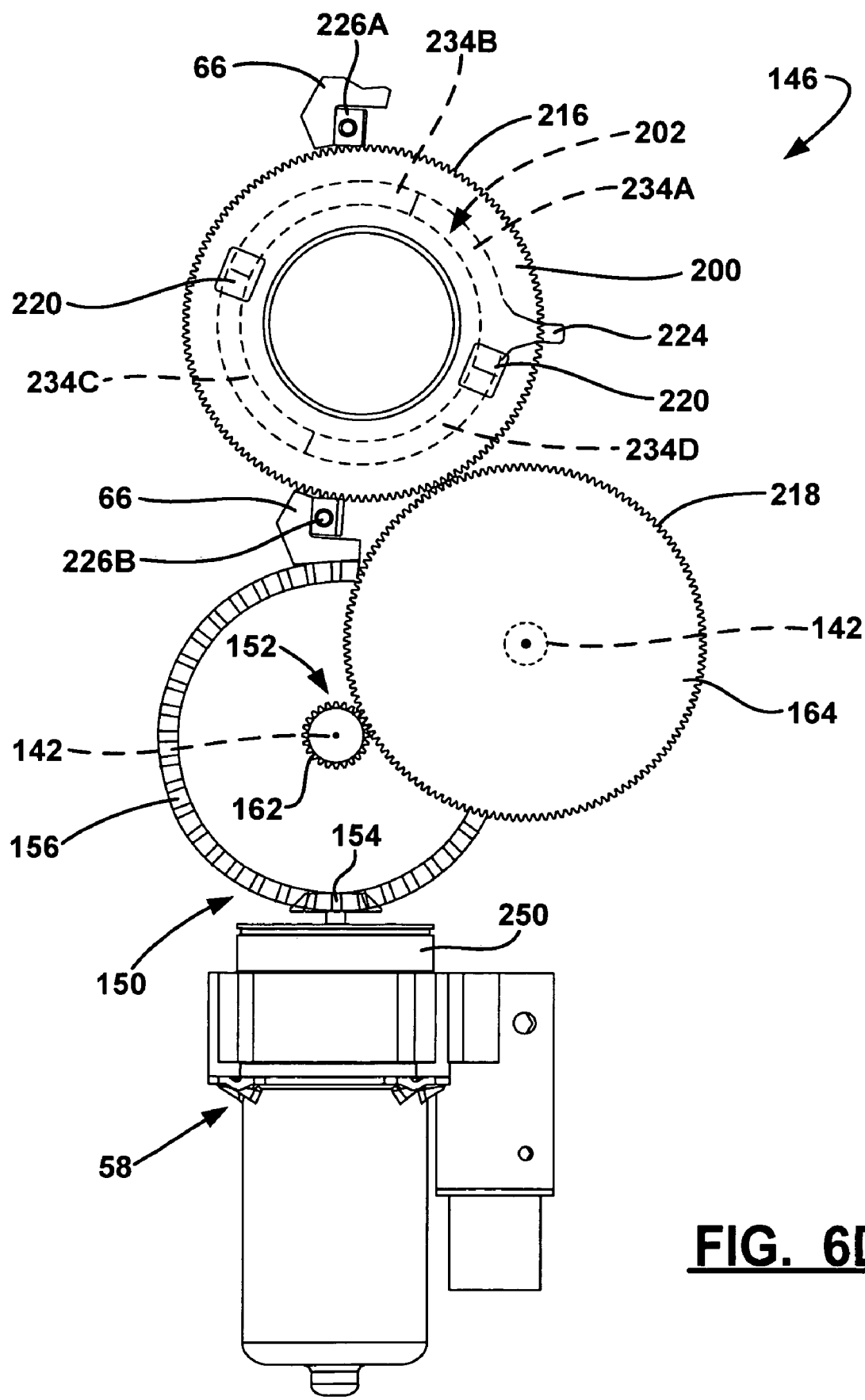

If the vehicle operator selects the LOCK-4WH drive mode, electric motor 58 is energized to rotate second gear 164 and control gear 200 in their respective first directions until control gear 200 is located in the position shown in FIG. 6C. As such, rollers 220 have caused cam member 202 to move to its extended position which, in turn, moves pressure plate 126 to its locked position for fully engaging mode clutch assembly 46. To limit the on-time service requirements of electric motor 58, a power-off brake 250 could be installed to brake rotation of the motor shaft so as to prevent back-driving rotation of geartrain 140 for maintaining pressure plate 126 in its locked position. In this manner, electric motor 58 can be shut-off during operation of transfer case 20 in its LOCK-4WH drive mode. To reiterate, shift collar 84 is maintained in its H position because high-range dwell segment 174 of groove 173 in range cam 172 accommodates the rotation of driveshaft 142 caused by actuation of second gear 164 in its first direction.

If the Neutral mode is selected, second gear 164 is rotated in its second (i.e., counter-clockwise) direction for concurrently rotating driveshaft 142. Such rotation of driveshaft 142 causes follower pin 184 on range fork 180 to ride within shift segment 178 of groove 173 in range cam 172 until shift collar 84 is located in its N position. During such range shifting, mode clutch 46 is maintained in its released state. Specifically, the rotation of second gear 164 in its second direction also causes rotation of control gear 200 in its second (i.e., clockwise) direction from the position shown in FIG. 6A to that shown in FIG. 6D. The continuous engagement of cam member 202 with rollers 220 due to the biasing of disk levers 128 causes cam member 202 to also rotate in its second direction in concert with control gear 200, thereby maintaining cam member 202 in its retracted position. As seen, lug 224 is generally located halfway between stops 226A and 226B when the Neutral mode is established.

Figure 6E:
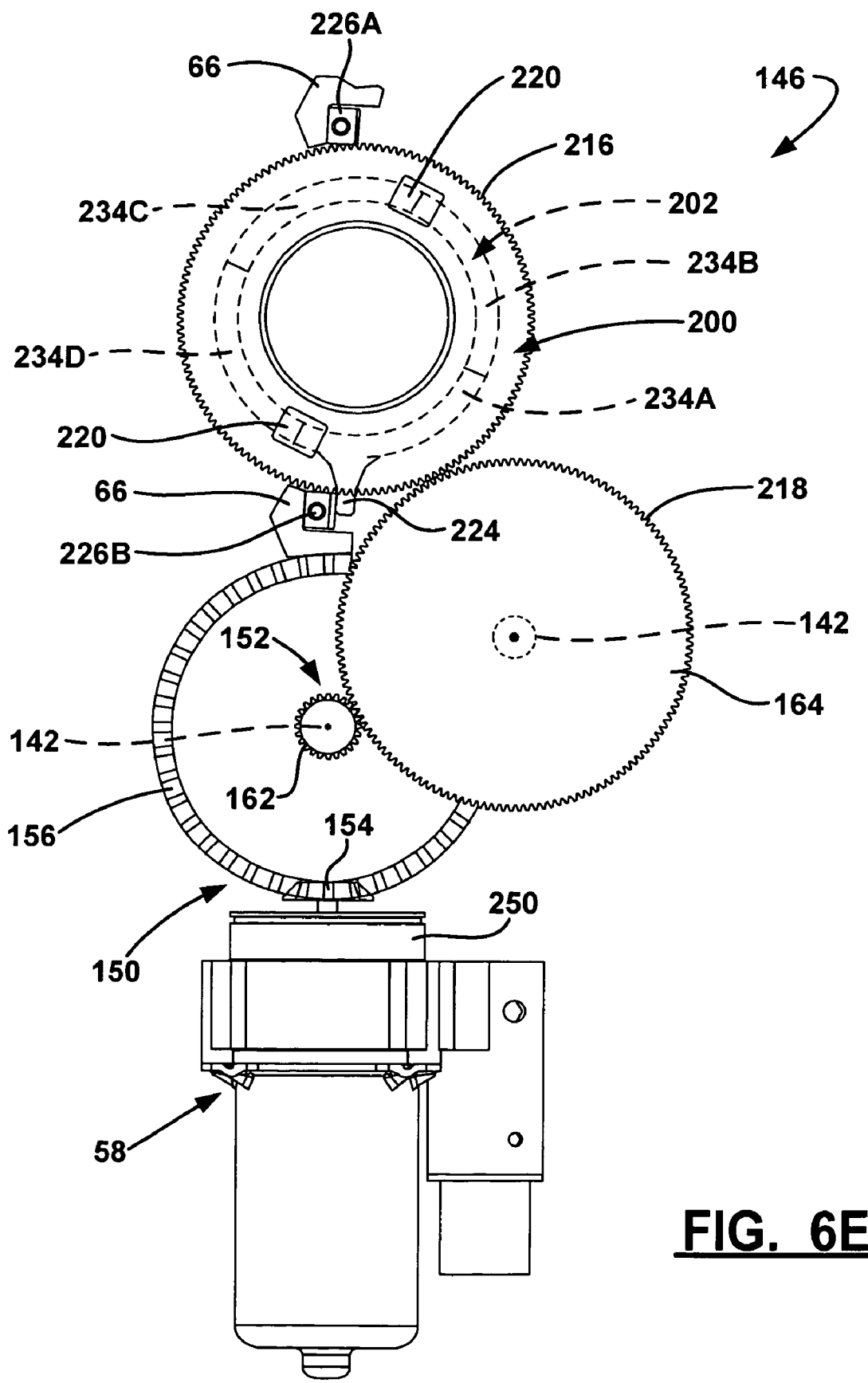
Figure 6F:
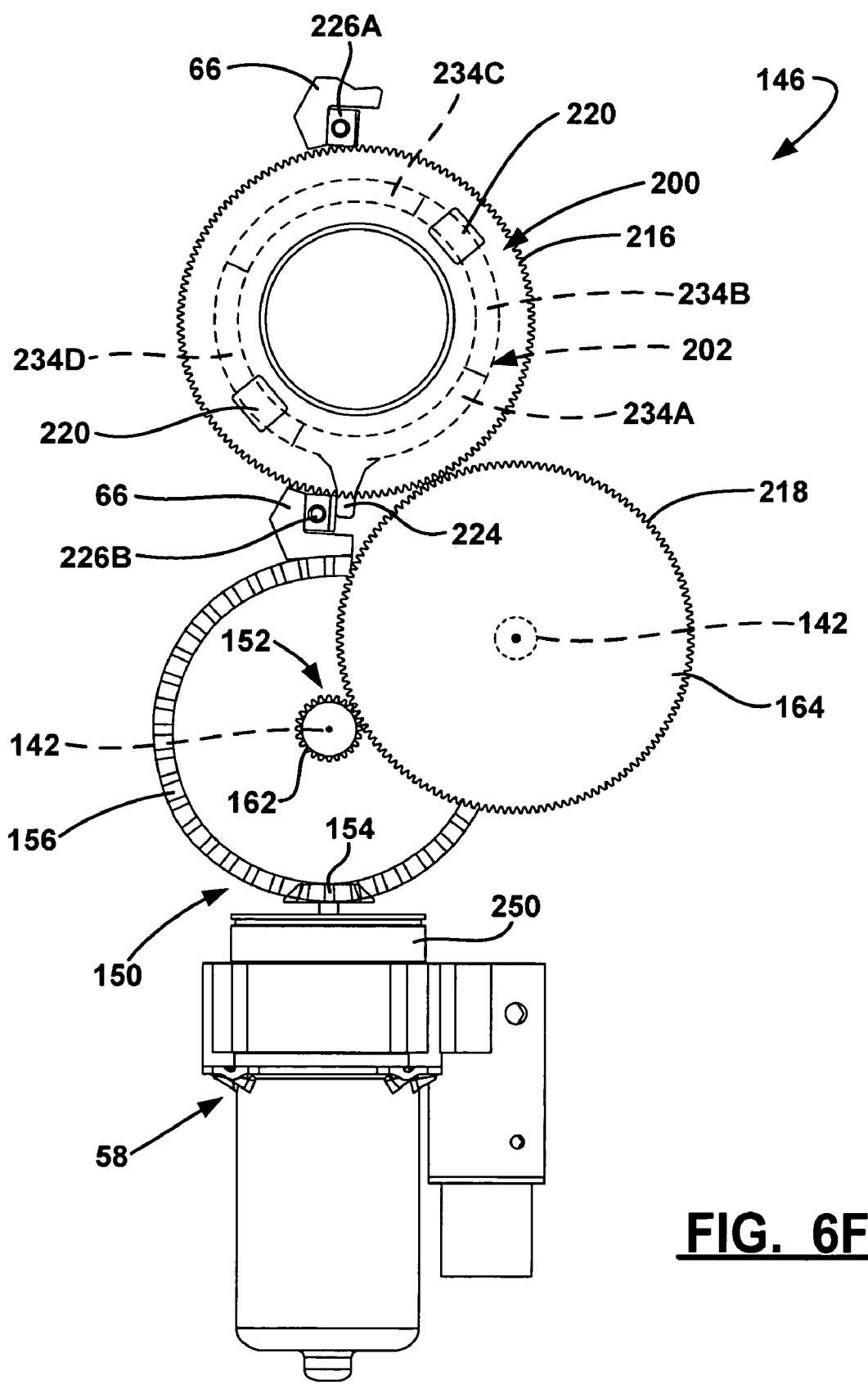

FIG. 6E illustrates the position of the components associated with transfer case 20 for establishing the 4WL drive mode. In particular, second gear 164 has been rotated in its second direction to a position whereat: A) concurrent rotation of driveshaft 142 has caused shift collar 84 to move to its L position; and B) the resulting rotation of control gear 200 in its second position has caused cam member 202 to rotate until its lug 224 now engages anti-rotation stop 226B. In this position, cam member 202 is in its retracted position such that mode clutch assembly 46 is released.

When mode select mechanism 54 indicates selection of the AWL drive mode, ECU 56 energizes motor 58 to cause geartrain 140 to continue rotation of second gear 164 in its second direction. Shift collar 84 is maintained in its L position due to follower pin 184 entering low-range dwell segment 176 of groove 173 in range cam 172 during such continued rotation of driveshaft 142. Furthermore, engagement of lug 224 with stop 226B prevents further rotation of cam member 202 while control gear 200 continues to rotate to the position shown in FIG. 6F. This relative rotation causes cam member 202 to move axially to its adapt position due to rollers 220 engaging ramp surface 234B and 234D. Similar to operation in the AWH drive mode, ECU 56 controls the magnitude of engagement of clutch assembly 46 by controlling the position of control gear 200 between the positions shown in FIGS. 6F and 6G which, in turn, moves cam member 202 between its adapt position and its locked positions. Such adaptive control is again based on a predetermined control strategy utilizing the signals inputted to ECU 56 from sensors 52.

Figure 6G:
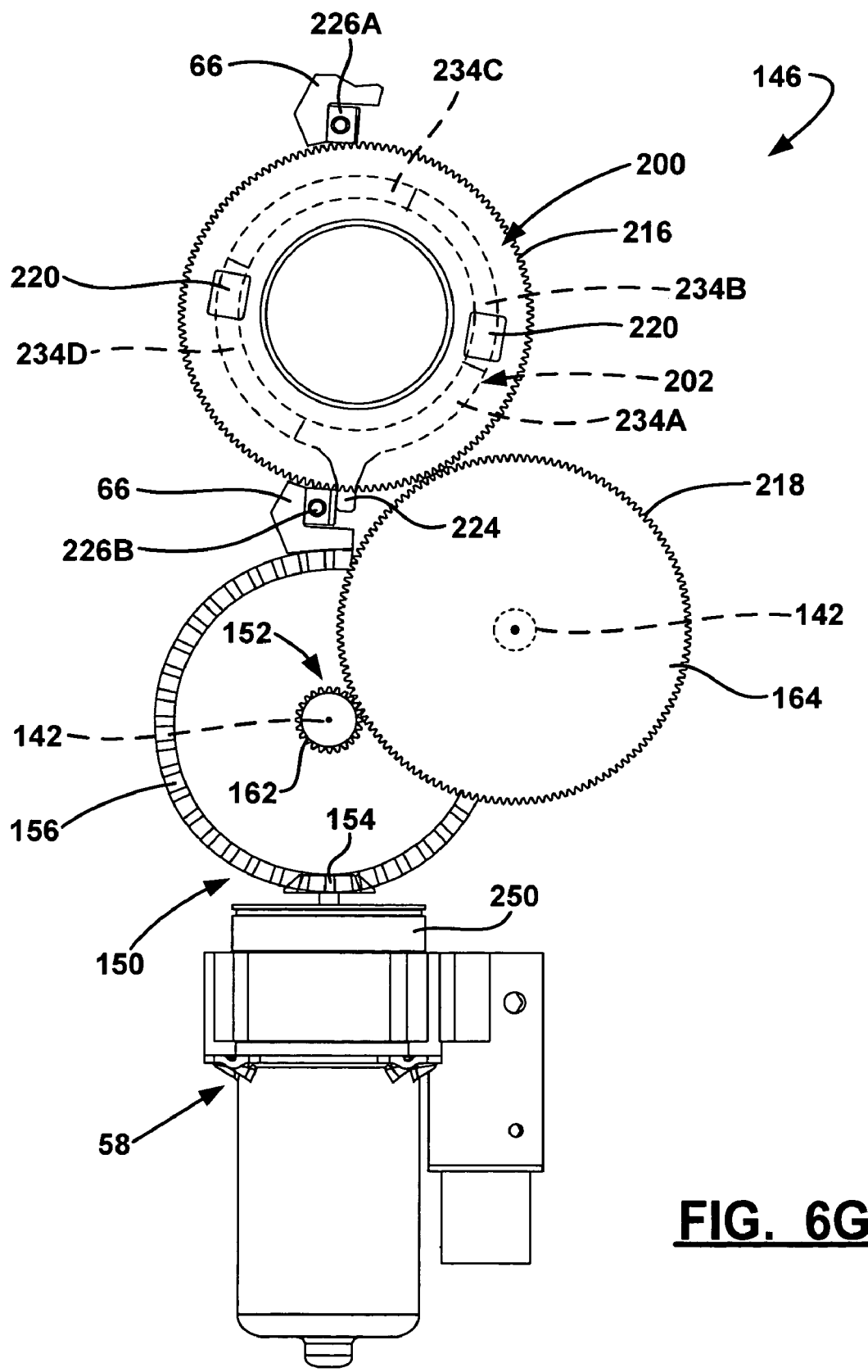

Referring to FIG. 6G, the components are shown for establishing the LOCK-4WL mode with shift collar 84 in its L position and mode clutch assembly 46 fully engaged due to second gear 164 being rotated in its second direction until control gear 200 is located as shown. In this position, cam member 202 is in its extended position for moving pressure plate 126 to its locked position, thereby fully engaging clutch assembly 46. Again, brake 250 would be engaged to prevent rotation of geartrain 140 and hold second gear 164 in the position defining the LOCK-4WL drive mode while permitting electric motor 58 to be de-energized.

According to the present invention, mode actuator assembly 146 and range actuator assembly 144 are interconnected by a common geartrain 140 so as to permit coordinated actuation of both using a single power-operated device, namely electric motor 58. Mode actuator assembly 146 accommodates actuation of range actuator assembly 144 while mode clutch 46 is maintained in a released state for permitting movement of shift collars 84 between its three distinct range positions. Likewise, range actuation assembly 144 accommodates actuation of mode actuator assembly 146 when shift collar 84 is positively located in one of its H and L positions to permit adaptive engagement of clutch assembly 46. To this end, bi-directional rotation of second gear 164 through three distinct ranges of angular travel achieves this coordination feature. Specifically, a first range, identified in FIG. 6A as angle "X", controls movement of shift collar 84 while cam member 202 is maintained in its retracted position. A second angular range, identified as angle "Y" controls engagement of clutch assembly 46 while shift collar 84 is maintained in its H position. Finally, a third range is identified as angle "Z" and controls engagement of clutch assembly 46 when shift collar 84 is maintained in its L position.

While actuation mechanism 48 has been disclosed in association with full-time transfer case 20, it will be understood that interaxle differential 44 could be eliminated such that mode clutch assembly 46 functions to modulate the drive torque transferred from rear output shaft 40 to front output shaft 30 to establish an on-demand four-wheel drive mode. A modified version of transfer case 20 shown in FIG. 2 is now shown in FIG. 8 as transfer case 20A which is operable to define various two-wheel and four-wheel drive modes. Basically, shift collar 84 now includes a drive ring 254 that is splined to a drive ring 256 fixed (i.e., splined) to rear output shaft 40 while clutch assembly 46 is arranged to transfer drive torque from rear output shaft 40 to front output shaft 30. Again, power-operated actuation mechanism 48 is operable to coordinate movement of shift collar 84 and cam member 202 to establish various locked and on-demand four-wheel high-range and low-range drive modes as well as two-wheel drive modes.

Figure 8:
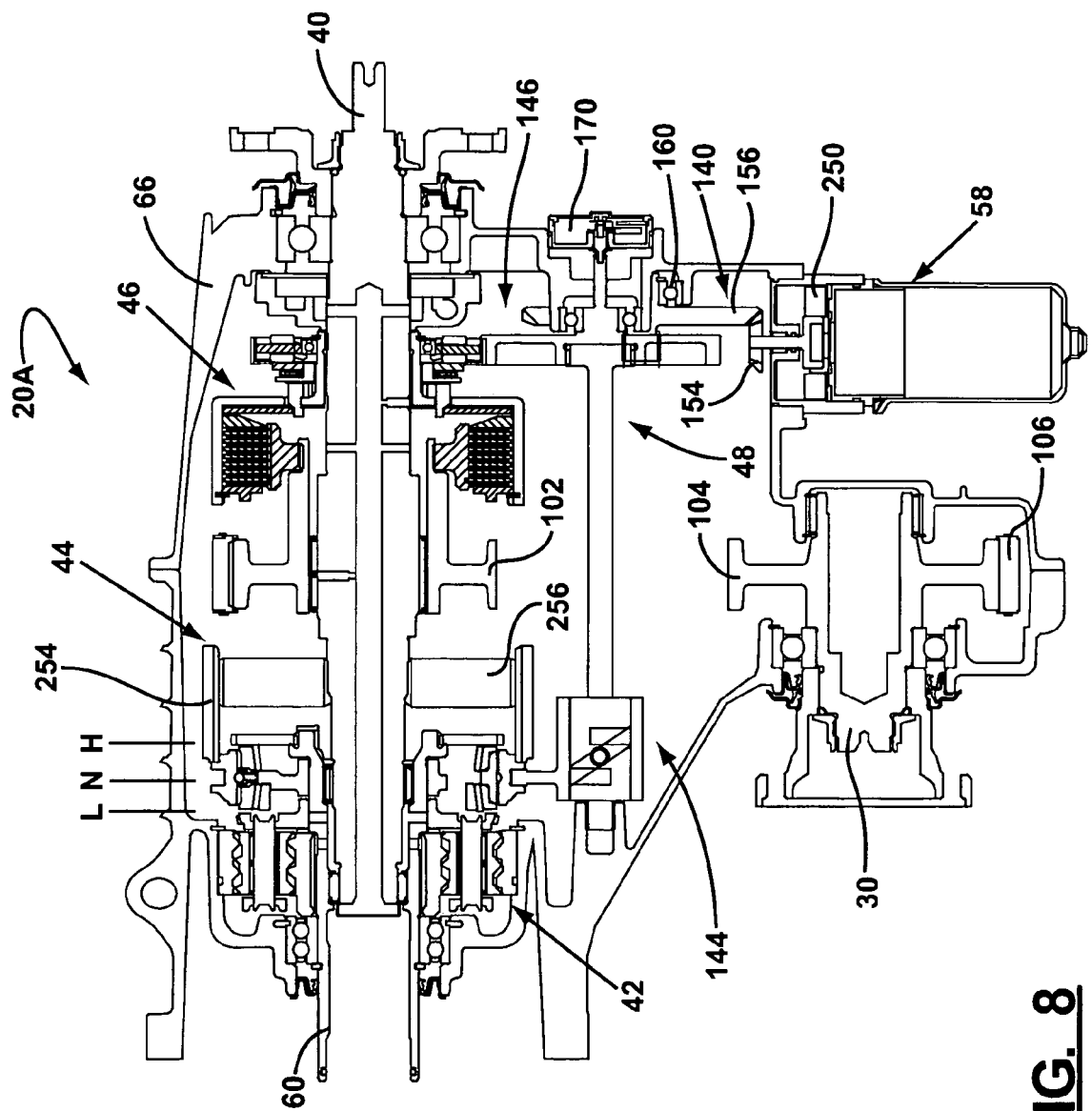
FIG. 8 is a sectional view of a two-speed on-demand transfer case according to an alternative preferred embodiment of the present invention.

When on-demand transfer case 20A of FIG. 8 is used in association with vehicle 10 of FIG. 1, mode select mechanism 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a Neutral mode, and a part-time four-wheel low-range (LOCK-4WH) drive mode. Specifically, in the 2WH drive mode, geartrain 140 would be rotated to the position shown in FIG. 6A, whereby shift collar 84 would be located in its H position and clutch assembly 46 would be released such that all drive torque is delivered to rear output shaft 40. In the AUTO-4WH mode, shift collar 84 would be located in its H position and clutch assembly 46 would be continuously modulated based on the value of the sensor signals to vary the torque distribution ratio between rear output shaft 40 and front output shaft 30 in a range between 100:0 and 50:50. This mode is established by controlling rotation of geartrain 40 between the positions shown in FIGS. 6B and 6C. In the LOCK-4WH position, actuation mechanism 48 rotates geartrain 140 to the position shown in FIG. 6C, whereby shift collar 84 would still be located in its H position and clutch assembly 46 would be fully engaged to effectively couple front output shaft 30 to rear output shaft 40. Selection of the Neutral mode causes actuator mechanism 48 to rotate geartrain 140 to the position shown in FIG. 6D, whereby no drive torque is transferred to rear driveshaft 40. When the LOCK-4WL mode is selected, ECU 56 controls actuation mechanism 48 to rotate geartrain 140 to the position shown in FIG. 6G, whereby shift collar 84 is located in its L position while fully engaging clutch assembly 46.

The arrangement described for actuation mechanism 48 is an improvement over the prior art in that the torque amplification provided by reduction gearset 140 combined with the force amplification provided by mode actuator assembly 146 and disk levers 128 permit use of a small low-power electric motor and yet provides extremely quick response and precise control over the position of cam member 202 and thus the magnitude of the clutch engagement force applied to clutch pack 118. In this regard, the present invention is designed to provide a constant mechanical advantage so as to generate a constant torque to force conversion regardless of the rotated position of control gear 200. This feature allows actuation mechanism 48 to be less sensitive to component manufacturing and assembly-related clearances. In addition, fixation of rollers 220 to control gear 200 provides a positive connection so that roller 220 can be driven to any desired position in either direction without reliance on the need to "back drive" upon release. Furthermore, the 360° of angular rotation of control gear 200 improves the resolution characteristics of position sensor 170 for more precise control of the system. Finally, all forces generated are contained by drum 114, thereby permitting the clutch assembly to be packaged into several different driveline configurations without affecting the loads transferred through the main bearings.

The above referenced embodiments clearly set forth the novel and unobvious features, structure and/or function of the present invention. However, one skilled in the art will appreciate that equivalent elements and/or arrangements made be used which will be covered by the scope of the following claims.

What is claimed is:

1. A transfer case comprising:
   an input shaft;
   first and second output shafts;
   a range unit driven at a reduced speed relative to said input shaft;
   a range clutch operable in a first range position to establish a drive connection between said input shaft and said first output shaft and further operable in a second range position to establish a drive connection between said range unit and said first output shaft;
   a mode clutch operable in a first mode position to disengage said second output shaft from driven engagement with said first output shaft and further operable in a second mode position to establish a drive connection between said first output shaft and said second output shaft;
   a geartrain having an input gear driving an output gear;
   a motor driving said input gear;
   a range actuator driven by said output gear for moving said range clutch between its first and second range positions;
   a mode actuator driven by said output gear for moving said mode clutch between its first and second mode positions; and
   a control system for actuating said motor to control the magnitude and direction of rotation of said output gear through three distinct ranges of travel so as to coordinate movement of said range clutch and said mode clutch.

2. The transfer case of claim 1 wherein rotation of said output gear through a first range of travel causes said range actuator to move said range clutch between its first and second range positions while said mode actuator maintains said mode clutch in its first mode position, and wherein rotation of said output gear through a second range of travel causes said range actuator to maintain said range clutch in its first range position while said mode actuator moves said mode clutch between its first and second mode positions.

3. The transfer case of claim 2 wherein rotation of said output gear through a third range of travel causes said range actuator to maintain said range clutch in its second range position while said mode actuator moves said mode clutch between its first and second mode positions.

4. The transfer case of claim 2 wherein said first range of rotary travel of said output gear equals about 180° and said second range of rotary travel of said output gear equals about 90°.

5. The transfer case of claim 1 wherein said geartrain includes a first gearset having said input gear driven by said motor and a first transfer gear driven by said input gear for rotation about a first axis, and a second gearset having a second transfer gear driven by said first transfer gear and which drives said output gear for rotation about a second axis.

6. The transfer case of claim 1 wherein said range actuator comprises:
   a driveshaft coupled for rotation with said output gear;
   a range cam coupled for rotation with said driveshaft;
   a shift fork coupled to said range clutch; and a mechanism interconnecting said shift fork to said range cam which is operable to convert rotary movement of said range cam into axial movement of said shift fork for moving said range clutch between its first and second range positions.

7. The transfer case of claim 6 wherein said mechanism includes a follower secured to said shift fork which extends into a groove formed in said range cam, said groove including a first dwell segment, a second dwell segment, and a shift segment interconnecting said first and second dwell segments, said shift segment is configured to cause axial movement of said range clutch between its first and second range positions during rotation of said driveshaft caused by rotation of said output gear through a first range of rotary travel, said first dwell segment is configured to maintain said range clutch in its first range position during rotation of said driveshaft caused by rotation of said output gear through a second range of rotary travel, and said second dwell segment is configured to maintain said range clutch in its second range position during rotation of said driveshaft caused by rotation of said output gear through a third range of rotary travel.

8. The transfer case of claim 1 wherein said mode actuator comprises:
   a control gear rotatably driven by said output gear;
   a cam member having a first cam surface, a second cam surface, and an anti-rotation lug; and
   a roller disposed between said control gear and said cam member that is adapted to engage said first and second cam surfaces, wherein said mode clutch is moveable between its first and second mode positions in response to movement of said cam member between a retracted position and an extended position relative to said control gear.

9. The transfer case of claim 8 wherein rotation of said output gear within a first range of rotary travel causes corresponding rotation of said control gear through a first range of rotary travel, and wherein rotation of said control gear through its first range of rotary travel causes concurrent rotary movement of said cam member while said cam member is maintained in its retracted position.

10. The transfer case of claim 9 wherein rotation of said output gear within a second range of rotary travel causes corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation causes said roller to ride on said first cam surface and forcibly move said cam member between its retracted and extended positions.

11. The transfer case of claim 10 wherein rotation of said output gear within a third range of rotary travel causes corresponding rotation of said control gear through a third range of rotary travel, and wherein rotation of said control gear through its third range of rotary travel causes said anti-rotation lug on said cam member to engage a second anti-rotation stop such that said control gear rotates relative to said cam member, whereby such relative rotation causes said roller to ride on said second cam surface and axially move said cam member between its retracted and extended positions.

12. A transfer case comprising:
   an input shaft;
   first and second output shafts;
   a range unit driven at a reduced speed relative to said input shaft;
   a differential having an input component, a first output component driving said first output shaft and a second output component driving said second output shaft;
   a range clutch operable in a first range position to establish a drive connection between said input shaft and said input component and further operable in a second range position to establish a drive connection between said range unit and said input component;
   a mode clutch operable in a first mode position to permit speed differentiation between said first and second output shafts and further operable in a second mode position to inhibit speed differentiation between said first and second output shafts;
   a geartrain having an input gear driving an output gear;
   a motor driving said input gear;
   a range actuator driven by said output gear for moving said range clutch between its first and second range positions;
   a mode actuator driven by said output gear for moving said mode clutch between its first and second mode positions; and
   a control system for actuating said motor to control the magnitude and direction of rotation of said output gear through three distinct ranges of travel so as to coordinate movement of said range clutch and said mode clutch.

13. The transfer case of claim 12 wherein rotation of said output gear through a first range of travel causes said range actuator to move said range clutch between its first and second range positions while said mode actuator maintains said mode clutch in its first mode position, and wherein rotation of said output gear through a second range of travel causes said range actuator to maintain said range clutch in its first range position while said mode actuator moves said mode clutch between its first and second mode positions wherein rotation of said output gear through a third range of travel causes said range actuator to maintain said range clutch in its second range position while said mode actuator moves said mode clutch between its first and second mode positions.

14. The transfer case of claim 13 wherein said first range of rotary travel of said output gear equals about 180° and said second range of rotary travel of said output gear equals about 90°.

15. The transfer case of claim 12 wherein said geartrain includes a first gearset having said input gear driven by said motor and a first transfer gear driven by said input gear for rotation about a first axis, and a second gearset having a second transfer gear driven by said first transfer gear and which drives said output gear for rotation about a second axis.

16. The transfer case of claim 12 wherein said range actuator comprises:
   a driveshaft coupled for rotation with said output gear;
   a range cam coupled for rotation with said driveshaft;
   a shift fork coupled to said range clutch; and
   a mechanism interconnecting said shift fork to said range cam which is operable to convert rotary movement of said range cam into axial movement of said shift fork for moving said range clutch between its first and second range positions.

17. The transfer case of claim 16 wherein said mechanism includes a follower secured to said shift fork which extends into a groove formed in said range cam, said groove including a first dwell segment, a second dwell segment, and a shift segment interconnecting said first and second dwell segments, said shift segment is configured to cause axial movement of said range clutch between its first and second range positions during rotation of said driveshaft caused by rotation of said output gear through a first range of rotary travel, said first dwell segment is configured to maintain said range clutch in its first range position during rotation of said driveshaft caused by rotation of said output gear through a second range of rotary travel, and said second dwell segment is configured to maintain said range clutch in its second range position during rotation of said driveshaft caused by rotation of said output gear through a third range of rotary travel.

18. The transfer case of claim 12 wherein said mode actuator comprises:
a control gear rotatably driven by said output gear;
a cam member having a first cam surface, a second cam surface, and an anti-rotation lug; and
a roller disposed between said control gear and said cam member that is adapted to engage said first and second cam surfaces, wherein said mode clutch is moveable between its first and second mode positions in response to movement of said cam member between a retracted position and an extended position relative to said control gear.

19. The transfer case of claim 18 wherein rotation of said output gear within a first range of rotary travel causes corresponding rotation of said control gear through a first range of rotary travel, and wherein rotation of said control gear through its first range of rotary travel causes concurrent rotary movement of said cam member while said cam member is maintained in its retracted position wherein rotation of said output gear within a second range of rotary travel causes corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation causes said roller to ride on said first cam surface and forcibly move said cam member between its retracted and extended positions, wherein rotation of said output gear within a third range of rotary travel causes corresponding rotation of said control gear through a third range of rotary travel, and wherein rotation of said control gear through its third range of rotary travel causes said anti-rotation lug on said cam member to engage a second anti-rotation stop such that said control gear rotates relative to said cam member, whereby such relative rotation causes said roller to ride on said second cam surface and axially move said cam member between its retracted and extended positions.

20. A transfer case comprising:
an input shaft;
first and second output shafts;
a range unit driven by said input shaft and having an output component driven at a reduced speed relative to said input shaft;
a dog clutch operable in a first range position to couple said input shaft to said first output shaft for establishing a high-range drive connection, said dog clutch is further operable in a second range position to couple said output component of said range unit to said first output shaft for establishing a low-range drive connection;
a mode clutch including a clutch pack operably disposed between said first and second output shafts and a pressure plate moveable between a first mode position whereat a minimum clutch engagement force is exerted on said clutch pack and a second mode position whereat a maximum clutch engagement force is exerted on said clutch pack; and
an actuation mechanism including a geartrain having an input gear and an output gear, a motor driving said input gear, a range actuator driven by said output gear for moving said dog clutch between its first and second range positions, and a mode actuator driven by said output gear for moving said pressure plate between its first and second mode positions, said output gear being rotatable through three distinct ranges of rotary travel for causing said range and mode actuators to coordinate movement of said dog clutch and said pressure plate, wherein said output pear is rotatable through a first range of travel for causing said range actuator to move said dog clutch between its first and second range positions while said mode actuator maintains said pressure plate in its first mode positions, wherein said output gear is rotatable through a second range of travel for causing said range actuator to maintain said dog clutch in its first range position while said mode actuator moves said pressure plate between its first and second mode positions, and wherein said output gear is rotatable through a third range of travel for causing said range actuator to maintain said dog clutch in its second range position while said mode actuator moves said pressure plate between its first and second mode positions.

21. The transfer case of claim 20 wherein said first range of rotary travel of said output gear equals about 180° and said second and third ranges of rotary travel of said output gear each equal about 90°.

22. The transfer case of claim 20 wherein said mode actuator assembly comprises:
a control gear driven by said output gear;
a cam member having a first cam surface, a second cam surface, and an anti-rotation lug;
a roller mounted to said control gear and adapted to engage either of said first and second cam surfaces; and
a thrust member for causing axial movement of said pressure plate between its first and second mode positions in response to axial movement of said cam member between a retracted position and an extended position relative to said control gear.

23. The transfer case of claim 22 wherein rotation of said output gear within its first range of rotary travel causes corresponding rotation of said control gear through a first range of rotary travel, and wherein rotation of said control gear through its first range of rotary travel causes concurrent rotary movement of said cam member while said cam member is maintained in its retracted position.

24. The transfer case of claim 23 wherein rotation of said output gear within its second range of rotary travel causes corresponding rotation of said control gear through a second range of rotary travel, and wherein rotation of said control gear through its second range of rotary travel causes said anti-rotation lug on said cam member to engage a first anti-rotation stop such that said control gear rotates relative to said cam member, whereby such relative rotation causes said roller to ride on said first cam surface and forcibly move said cam member between its retracted and extended positions so as to cause corresponding movement of said pressure plate.

25. The transfer case of claim 24 wherein rotation of said output gear within its third range of rotary travel causes corresponding rotation of said control gear through a third range of rotary travel, and wherein rotation of said control gear through its third range of rotary travel causes said anti-rotation lug on said cam member to engage a second anti-rotation stop such that said control gear rotates relative to said cam member, whereby such relative rotation causes said roller to ride on said second cam surface and axially move said cam member between its retracted and extended positions so as to cause corresponding movement of said pressure plate.

* * * * *